United States Patent [19]
Jin

[11] Patent Number: 5,984,424
[45] Date of Patent: Nov. 16, 1999

[54] EMERGENCY BRAKE SYSTEM FOR A VEHICLE

[76] Inventor: Ki Hwan Jin, 86-12, Woosan-dong, Wonju, Rep. of Korea

[21] Appl. No.: 08/984,832

[22] Filed: Dec. 4, 1997

[51] Int. Cl.$^6$ .......................... B60T 13/74; B06K 41/20; F02D 13/04
[52] U.S. Cl. .......................... 303/2; 303/10; 303/DIG. 3; 303/13; 303/3; 303/9.61; 303/15; 188/151 A
[58] Field of Search .................. 303/2–3, 15, 20, 303/13–14, 16–18, 166, 113.4, 114.3, DIG. 3, DIG. 4, 155, 10–12, 112, 9.61, 6.01; 188/156, 158, 181 T, 271, 154, 273, 77 R, 249, 106 P, 106 F, 151 A; 477/188, 184, 185; 123/322; 60/565, 566, 567

[56] References Cited

U.S. PATENT DOCUMENTS

| | | | |
|---|---|---|---|
| 4,124,254 | 11/1978 | Hart | 303/2 |
| 5,417,477 | 5/1995 | Lasbleis | 303/9.61 |
| 5,441,335 | 8/1995 | Stumpe et al. | 303/3 |
| 5,607,209 | 3/1997 | Narita et al. | 303/15 |
| 5,636,910 | 6/1997 | Kost et al. | 303/155 |
| 5,762,407 | 6/1998 | Stacey et al. | 303/3 |
| 5,779,329 | 7/1998 | Takeshima | 303/113.4 |
| 5,816,665 | 10/1998 | Burnett et al. | 303/3 |
| 5,833,327 | 11/1998 | Kozakai | 303/113.4 |
| 5,845,976 | 12/1998 | Muenster | 303/113.4 |
| 5,851,057 | 12/1998 | Terazawa et al. | 303/113.4 |

*Primary Examiner*—Douglas C. Butler
*Attorney, Agent, or Firm*—Ladas & Parry

[57] ABSTRACT

Two methods of calibrating Fax machines are disclosed. The first method utilizes a pre-printed calibration chart and a computer connected to the Fax machine to be calibrated. The calibration chart is fed into the Fax machine which sends the resultant data to the computer. This data is analyzed by the computer to determine when the Fax machine started to scan the calibration chart. If the scan process did not occur at an optimum point, the computer sends a correction value back to the Fax machine to cause the Fax machine to begin scanning subsequent documents at an optimum point. In the second method, a calibration chart is printed by the Fax machine and then fed back into the machine. A copy of the scanned calibration chart is made to determine at what point the Fax machine began scanning the chart. If the Fax machine did not begin scanning at an optimum point, a user reads the copy and manually enters a corrective offset in to the Fax machine such that subsequent documents are scanned properly.

20 Claims, 4 Drawing Sheets

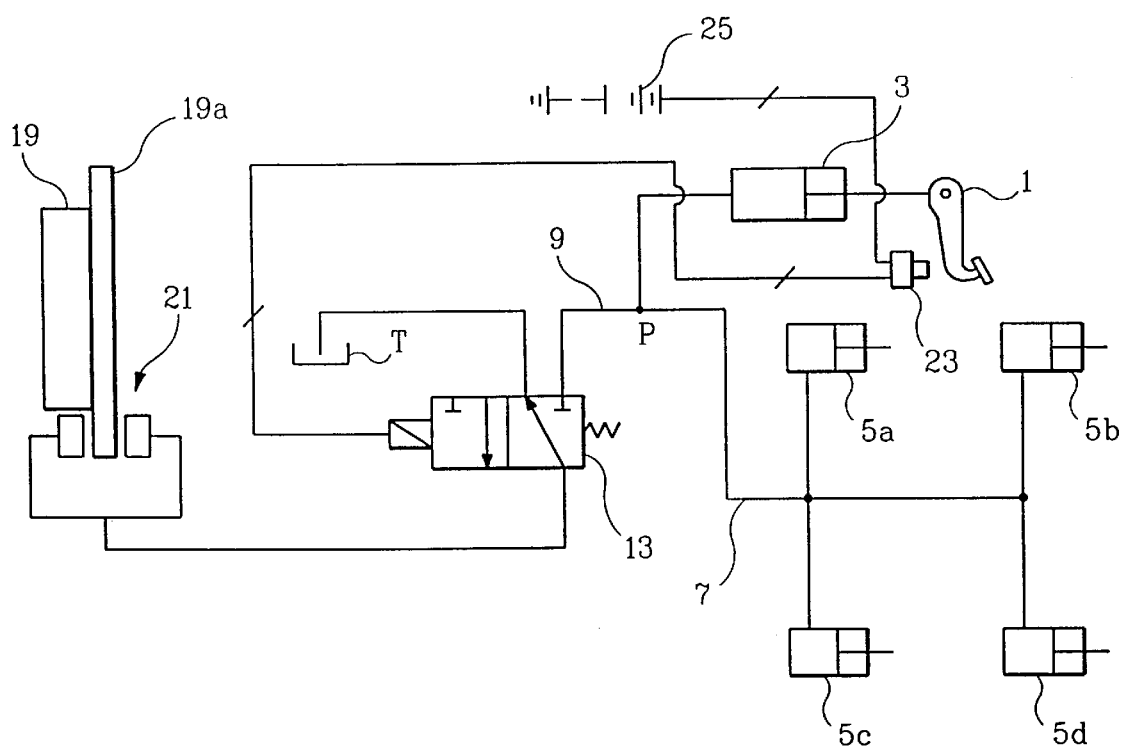
F I G. 5

EMERGENCY BRAKE SYSTEM FOR A VEHICLE

CROSS REFERENCE TO RELATED APPLICATION(S)

This is a continuation of application Ser. No. 08/413,573 filed on Mar. 30, 1995, now abandoned.

FIELD OF THE INVENTION

The present invention relates to facsimile machines. In particular, the present invention relates to a calibration system to enable the facsimile machine to begin scanning a sheet of paper as close to the leading edge as possible.

BACKGROUND OF THE INVENTION

Facsimile (Fax) machines "read" a document by scanning a light across document and detecting the intensity of the reflections. Feeding a document into a Fax machine to be scanned for transmission requires the use of two sensors. The first sensor determines if the user has placed a document into the document feeder. After tripping the first sensor, a second sensor is required to find the leading edge of that document so that the scanner can be turned on at the appropriate time.

If the scanner is turned on too early, before the edge of the document is over the scanner, a black shadow will appear in the scanned data due to the light reflecting from the edge of the document and being diverted from the scanner. This shadow is objectionable to the user. If the scanner is turned on too late, then any writing near the top of the document will be lost having never been scanned. The goal then is to scan as close to the leading edge of the document as possible without scanning the black shadow.

Traditional solutions to this problem have incorporated optical slot interrupter type sensors mounted on their own small printed circuit assembly (PCA). This assembly is then connected to a main PCA with a wiring harness/connector assembly. The optical sensors have mechanical "flags" which move as the paper travels through the paper path of the Fax. When a flag moves, it causes the optical sensor to change state signifying the paper is in a particular position in the Fax machine.

The leading edge sensor flag is positioned in the Fax machine such that when the leading edge of the document causes the flag to move, the document is in the proper position for the document scan to begin. While useable, this technique of detecting when the scan process should begin has many shortcomings. For example, the separate assembly is costly both in terms of material costs and in the additional labor required to assemble the Fax machine. Also the mechanical tolerance "stack-up" associated with the sensor assembly and its mounting does not lend itself to a small beginning scan margin. The beginning scan margin is the distance between the leading edge of the document and the line at which writing can be seen by the scanner. Because of the stack-up problems, Fax machines typically utilize a wide scan margin of about 4 millimeters (mm). Therefore any printing closer to the leading edge of the paper than 4 millimeters will not be scanned.

What is needed in the industry is a method of eliminating the need for a separate PCA for the paper sensors and for reducing the scan margin below 4 mm so that more of the document page can be utilized.

SUMMARY OF THE INVENTION

In a first preferred embodiment of the invention, a calibration sheet is fed into the Fax machine. The Fax machine scans the calibration sheet and sends data representing the scanned information to a computer. The computer monitors the data to detect a particular pattern present on the calibration sheet. When this pattern is detected, the computer compares the position of the pattern as scanned by the Fax to a known position and sends a correction value to the Fax machine. The Fax machine uses this correction value to determine at what position a document must be at with respect to the scan apparatus before the Fax machine scans the document. Preferably, the correction value (offset) is stored in a SRAM used by the Fax machine to store telephone numbers and other permanent data.

By this method, a Fax machine is calibrated to begin scanning a document when the document is at an optimum position. In addition, this calibration method automatically compensates for any tolerance stack-up which occurred during the manufacturing of the Fax machine.

In a second preferred embodiment of the invention, a calibration sheet having a calibration pattern is fed into the Fax machine. The Fax machine scans the calibration sheet and sends data to an associated printer causing the printer to print an image of the calibration sheet. A user reads information from the printed sheet to determine when the Fax machine started scanning the calibration sheet. The user then enters an offset value into the Fax machine to cause the Fax machine to begin scanning documents at an optimal position in the Fax machine.

This second means of calibration is particularly suitable for field service use after a particular Fax machine has been repaired or adjusted. By using this method, a field service person can recalibrate a Fax machine quickly, and to substantially the same precision as done during manufacturing, without having to have a computer.

Both embodiments allow for the precise calibration of a Fax machine thereby allowing the use of less than a 4 mm lead edge margin.

BRIEF DESCRIPTION OF THE DRAWINGS

FIG. 5 illustrates a calibration chart as printed by a Fax machine.

FIG. 6 illustrates a copy of the calibration chart.

FIG. 7 illustrates a copy of the calibration chart.

FIG. 8 illustrates a copy of the calibration chart.

FIG. 9 is a flow chart of the second preferred calibration method.

DETAILED DESCRIPTION OF THE DRAWINGS

Figure 1:
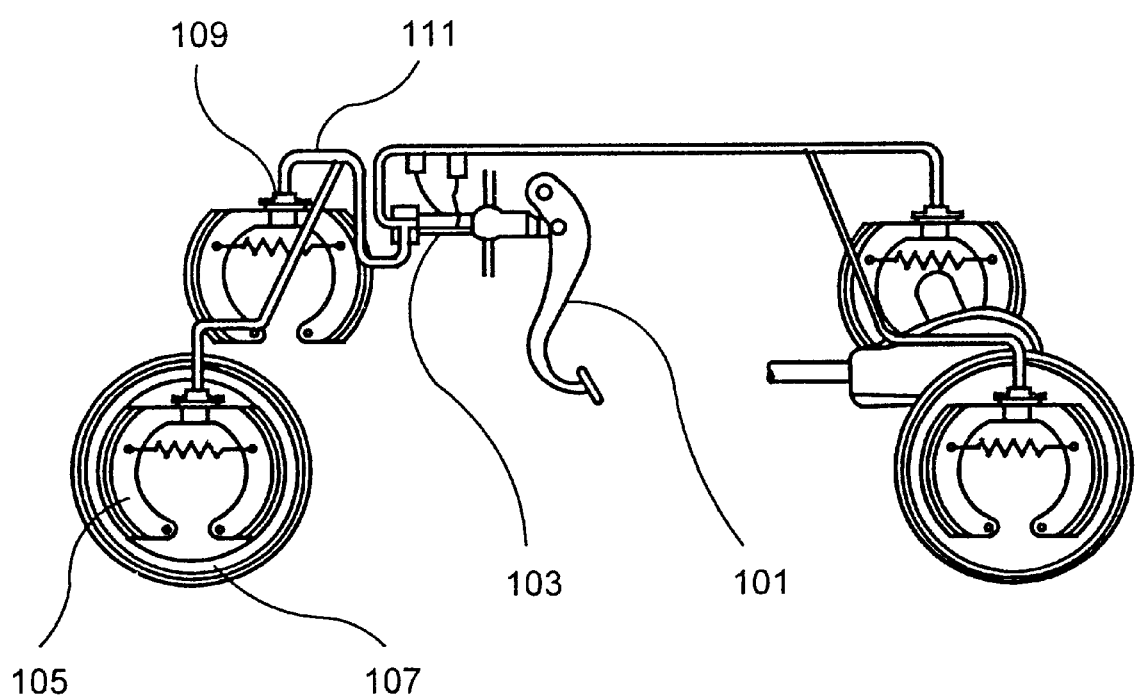
FIG. 1 is a side sectional view of a Fax machine according to the present invention.

FIG. 1 illustrates a Fax machine 101 having a document edge sensor 103 mounted to a front panel printed circuit board assembly (PCA) 105. The document edge sensor 103 has a rotating flag 107. A paper slot 109 is designed to guide a sheet of paper 111 through the Fax machine. To scan a document inserted into the Fax machine, an light emitting diode assembly 113 is provided to project light onto a document where it is reflected off the document. The reflected light 114 is directed by mirrors 115–119 to pass through an imaging lens 121 and project an image onto a charge coupled device (CCD) imager 123.

When a document 111 is fed into the Fax machine, the leading edge of the document forces the flag 107 to rotate upwards thereby changing the state of the document edge sensor 103. Once the edge sensor changes state, the Fax machine advances the document a preset amount (offset) before the Fax machine begins the scan process. The scan process causes the LED 113 to project light onto the surface of the document 111. This light is reflected back down into the Fax machine and directed to a CCD imager 123. The CCD imager 123 converts the light into digital data which is sent over the phone lines or used to print a copy of the document by sending the data to an associated printer (not shown).

Because the document edge sensor 103 is mounted to the front panel PCA, which is in turn mounted to the Fax machine through a variety of intervening parts, the exact position of the edge sensor relative to the scan mechanism is not known before assembly of the Fax machine is completed. Due to the various tolerance stack-ups, the edge sensor position is only known to be within the extremes of the possible combinations of tolerances of the individual pieces which comprise the Fax machine. Therefore it is not known in advance how far the document should be moved past where the flag 107 first caused the edge sensor 103 to change state.

As noted previously, if the scan process is started too early, a black line will appear in the resultant scan data. If the scan process is started too late, some of the document 111 will not be scanned. So either the document must be moved forward enough to allow for the worst case tolerance stack-up, which will typically result in a wide scan margin as is the case in the prior art, or a calibration process must be used on each Fax machine produced to find the optimum amount to move the document before the scan process begins.

Figure 2:
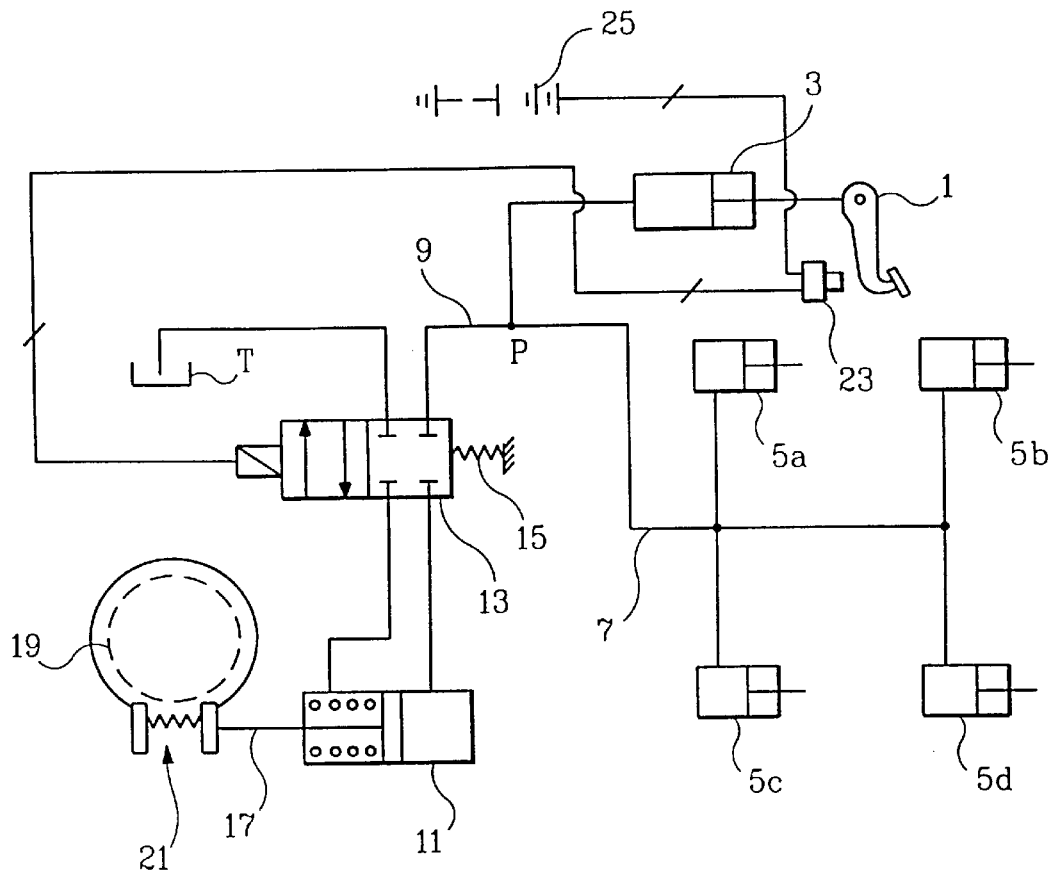
FIG. 2 illustrates a Fax machine connected to a computer.

FIG. 2 illustrates a preferred calibration method according the present invention. A Fax machine 101 is connected to a computer 201 through a bi-directional data path 203. A calibration chart is fed into the Fax machine 101 which scans the chart and sends the resultant data to the computer 201. The computer detects the beginning of a calibration pattern and thereby determines at what position of the calibration chart the Fax machine started scanning. If the scan start position is not optimum, the computer sends back to the Fax machine an offset value which is stored in an internal SRAM in the Fax machine. Internal SRAM or similar memory systems are routinely used in the industry to store telephone numbers or other data in Fax machines such that the contents of the memory are retained even if the Fax machine is unplugged from a power source. This offset value is then used by the Fax machine to control where the scan process will begin for all subsequent documents.

By using this method, each Fax machine manufactured can be quickly and accurately calibrated to produce the best results. Also this method automatically compensates for any variations in parts used to produce the Fax machine allowing the machines to be produced easily and quickly.

Figure 3:
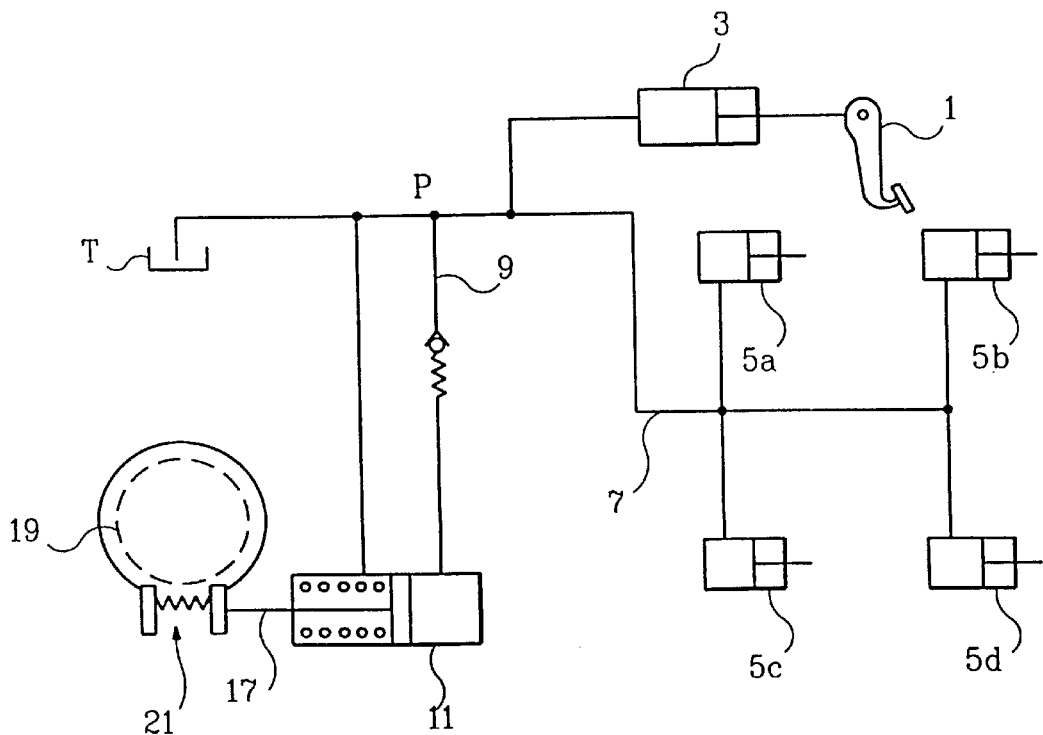
FIG. 3 illustrates a pre-printed calibration chart.

FIG. 3 illustrates a calibration chart 301. The chart has printed on it a calibration pattern 303 which in this case is a black line. The calibration pattern 303 is printed a preset distance 305 from the leading edge of the calibration chart.

When this chart is fed into the Fax machine being calibrated (FIG. 2), the Fax machine scans the chart sending data representing the color "white" until the calibration pattern 303 is reached by the scan process. Then data representing the color "black" is sent to the computer 201. The computer ascertains how much white data is sent before the black data is sent to determine at what point on the calibration chart 301 the Fax machine started scanning. A correction value (offset) is then sent to the Fax machine, if required, to calibrate the Fax machine.

Figure 4:
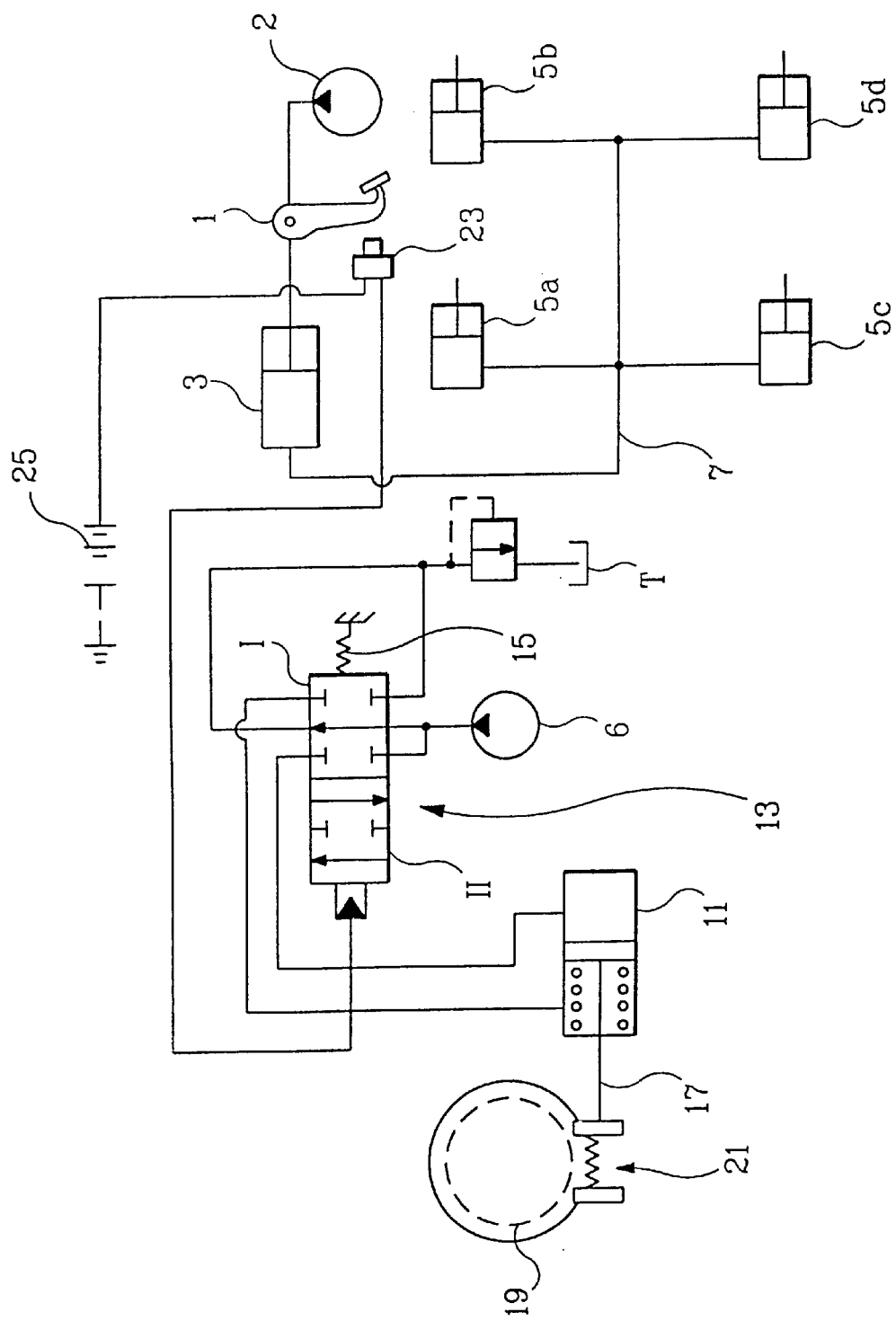
FIG. 4 is a flow chart of the first preferred calibration method.

FIG. 4 illustrates the steps followed to calibrate the Fax machine. In step 1, a preprinted calibration sheet is fed into the Fax machine. Then in step 2 the calibration sheet is scanned by the Fax machine and the resultant data is sent to the associated computer in step 3. The computer detects the beginning of the calibration pattern in step 4 and sends back to the Fax machine an offset correction value in step 5. Finally in step 6, the offset correction value is stored in permanent memory in the Fax machine where it is used to determine at what point the Fax machine will begin scanning subsequent documents.

The method and apparatus illustrated in FIGS. 2–4 are well tailored for the manufacturing environment where a large number of Fax machines must be calibrated quickly and cost effectively. In this environment preprinted calibration charts are available on the production lines for easy use and availability.

In a second preferred embodiment of the present invention, a calibration chart is printed by a printer associated with the Fax machine to be calibrated. FIG. 5 illustrates a printed calibration chart 501. The chart is printed with a cut-of line 503 and a calibration pattern 505 where the calibration pattern consists of a number of vertically staggered horizontal lines. Each of the horizontal lines are spaced a known vertical distance from adjacent lines. The calibration pattern is also printed a known distance below the cut-off line 503.

To use this chart 501, the user cuts along the cut-off line 503 thereby moving the leading edge of the calibration chart to where the cut-off line was located. This process ensures that the precise distance from the leading edge of the chart to the beginning of the calibration pattern is known and not skewed by anomalies in the printer. The user then adjusts the Fax machine to begin scanning the chart at approximately the middle of the calibration pattern. This is done by manually entering an artificial offset value into the Fax machine to cause the Fax machine to advance the paper well beyond where the chart leading edge causes the document edge sensor 103 to change state.

Then the calibration chart is fed into the Fax machine. The Fax machine is then caused to print a copy of the calibration chart on an associated printer. Because the Fax machine has been adjusted to scan late, not all of the calibration pattern will be printed on the copy. Instead, only the portion of the calibration pattern scanned will be printed on the copy.

FIG. 6 illustrates a copy 601 made by a correctly adjusted Fax machine. As illustrated, one half of the calibration pattern was printed with horizontal line 8 being the first line printed. Since no offset is needed for this Fax machine, the artificial offset is manually replaced with a value indicating no additional offset is needed by this particular Fax machine.

FIG. 7 illustrates a copy 701 made by a Fax machine having too much inherent offset. In this case, horizontal line 7 (703) is the first calibration line printed which indicates the Fax machine advanced the chart too far before the scan process began. To correctly adjust this Fax machine, the artificial offset value is manually replaced with a value indicating the Fax machine should not advance documents as far before the scan process is started (start scanning sooner after the document edge sensor 103 changes state).

FIG. 8 illustrates a copy 801 made by a Fax machine having too little inherent offset. Here the horizontal line 9

(803) is the first calibration line printed which indicates the Fax machine did not advance the chart enough before the scan process began. This machine is correctly calibrated by replacing the artificial offset value with a value indicating the Fax machine should advance documents more before the scan process is started (start scanning later after the document edge sensor 103 changes state).

The calibration chart 501 is designed such that the user can read off of the chart what the correction offset should be based on the amount of the calibration pattern printed on the copy. For the example illustrated in FIG. 6, the correct correction offset value may be "8", the number associated with the first horizontal line printed. This calibration method and apparatus is particularly suited for field calibration of Fax machines.

FIG. 9 illustrates the steps followed to calibrate a Fax machine according to the second preferred embodiment of the present invention. In step 1 a print calibration chart is printed by a printer associated with the Fax machine. This printer can be either integral to the Fax machine or auxiliary to the Fax machine. The top of the printed calibration chart is cut off in step 2 and the cut off chart is fed into the Fax machine in step 3. Then in step 4 the Fax machine scans the calibration chart after an artificial offset value has been entered into the Fax machine by the user. A copy of the calibration chart in printed in step 5 by the integral or auxiliary printer and the user reads the copy to determine at what point Fax machine began to scan the calibration pattern in step 6. The user then inputs a corrective offset value into the Fax machine so that subsequent documents are scanned at an optimal point. This offset value is stored in the Fax machine in an SRAM or other permanent memory.

Of course instead of printing a calibration chart with the Fax machine, a user could use a pre-printed calibration chart. In that case, the user would skip the print step and would not have to cut the top off of the chart.

Both of the preferred embodiments allow for the quick and effective calibration of Fax machines in either the manufacturing or field environments. In addition, both methods automatically compensate for manufacturing variations which would otherwise require a large lead edge margin to be used. The calibration methods also allow for the document leading edge sensor to be mounted in a cost effective location even if that position is subject to increased tolerance stack-up problems.

While two preferred embodiments of the invention have been described, other embodiments of the invention will be apparent to those skilled in the art from a consideration of this specification or practice of the invention disclosed herein. Therefore it is intended that the specification and examples be considered as exemplary only, with the scope of the invention being defined by the following claims.

I claim:

1. A method to calibrate a facsimile machine including a document feed path, a leading edge sensor and a scan mechanism, the method comprising the steps of:

feeding a calibration chart into the facsimile machine to be calibrated;

detecting a leading edge of the calibration chart;

advancing the calibration chart a preset amount along a document path after the leading edge has been detected;

after the calibration chart has been advanced by the preset amount, causing the facsimile machine to commence to scan the calibration chart and thereby produce a stream of output data;

sending the stream of output data to an associated computer;

causing the associated computer to determine where on the calibration chart relative to the leading edge the facsimile machine began scanning by monitoring the stream of output data;

causing the associated computer to send a correction offset value to the facsimile machine if the position where the facsimile machine began scanning the calibration chart was not at a predetermined position, the offset value determined by the association computer to adjust the preset amount to compensate for tolerance stacks-ups affecting the relative positions of the edge sensor and the scan mechanisms; and causing the facsimile machine to use the correction offset value to adjust where on a document the facsimile machine begins scanning.

2. A method as in claim 1 further including the step of:

causing the associated computer to determine where on the calibration chart the facsimile machine began scanning by detecting the beginning of the data stream and subsequently detecting data representing a calibration pattern contained on the calibration chart.

3. A method as in claim 1 further including the step of:

causing the correction offset value to be stored in a memory device within the facsimile machine.

4. A method as in claim 2 further including the step of:

detecting data representing a calibration pattern by detecting when data in the stream of output data changes from representing a first color to representing a second color.

5. A method as in claim 3 further including the step of:

causing the correction offset value to be stored in a memory device which retains its contents for an extended period of time without the facsimile machine being plugged into a power source.

6. A method as in claim 1, wherein the associated computer is adapted to determine the offset value to avoid starting the scan process too early wherein a black line would appear in the resultant scan data, and to avoid starting the scan process too late wherein some of the document would not be scanned.

7. A method to calibrate a facsimile machine including a document feed path, a leading edge sensor and a scan mechanism, the method comprising the steps of:

feeding an original calibration chart having a calibration pattern into the facsimile machine to be calibrated;

detecting a leading edge of the calibration chart;

advancing the calibration chart a preset amount along a document path after the leading edge has been detected;

after the calibration chart has been advanced by the preset amount, causing the facsimile machine to commence to scan the calibration chart and thereby produce a stream of output data;

causing the facsimile machine to print a copy of the original calibration chart using the stream of output data;

manually reading the copy of the calibration chart and determining where on the original calibration chart the facsimile machine started scanning; and manually entering a correction offset value into the facsimile machine to adjust where on a document the facsimile machine begins scanning, the offset value to adjust the preset amount to compensate for tolerance stack-ups affecting the relative positions of the edge sensor and the scan mechanism.

8. A method as in claim 7 further comprising the step of:

causing the correction offset value to be stored in a memory device which retains its contents for an extended period of time without the facsimile machine being plugged into a power source.

9. A method as in claim 7 further comprising the step of: determining where on the original calibration chart the facsimile machine started scanning by determining how much of the calibration pattern was printed on the copy of the calibration chart.

10. A method as in claim 7 further comprising the step of: feeding an original calibration chart having a calibration pattern consisting of a series of vertically spaced horizontal lines in the facsimile machine.

11. A method as in claim 7 further comprising the step of: determining the correction offset value by manually reading a number associated with a first part of the calibration pattern printed on the copy of the calibration chart.

12. A method as in claim 7, wherein the offset value is selected to avoid starting the scan process too early wherein a black line would appear in the resultant scan data, and to avoid starting the scan process too late wherein some of the document would not be scanned.

13. A facsimile machine including a paper advance apparatus for feeding a document along a document feed path, in combination with a calibrating apparatus, the combination comprising:
   a facsimile machine leading edge sensor for detecting the leading edge of a document being advanced along said document feed path;
   a facsimile machine scan mechanism;
   a calibrating apparatus for calibrating the position of the leading edge sensor relative to the scan mechanism, the apparatus including:
   an associated computer;
   a calibration chart;
   means for operating the paper advance apparatus for advancing the calibration chart a preset amount along a document path after the leading edge has been detected;
   means activated after the calibration chart has been advanced by the preset amount for activating the scan mechanism to scan the calibration chart and thereby produce a stream of output data;
   said associated computer including means responsive to said output data stream for determining where on the calibration chart relative to the leading edge the facsimile machine began scanning by monitoring the stream of output data and determining an offset value to adjust the preset amount to compensate for tolerance stack-ups affecting the relative positions of the edge sensor and the scan mechanism; and
   means responsive to said offset value to adjust where on a document the facsimile machine begins scanning.

14. A facsimile machine including document advancing apparatus for moving a document along a feed path, in combination with a calibration apparatus, the combination comprising:
   a document feed path;
   a leading edge sensor for detecting the leading edge of a document being advanced along the feed path;
   a scan mechanism;
   apparatus for advancing a document a preset amount after its leading edge has been detected;
   apparatus for calibrating the relative position of the leading edge sensor and the scan mechanism, comprising an original calibration chart having a calibration pattern;
   means operable in a calibration mode for advancing the calibration chart a preset amount along a document path after the leading edge has been detected;
   means for activating the scan mechanism and scanning the calibration chart and thereby producing a stream of output data;
   means for printing a copy of the original calibration chart using the stream of output data; and
   data entry means for receiving a manually entered correction offset value into the facsimile machine to adjust where on a document the facsimile machine begins scanning, the offset value to adjust the preset amount to compensate for tolerance stack-ups affecting the relative positions of the edge sensor and the scan mechanism.

15. A facsimile device calibration system, comprising:
   a sensor arrangement for determining the presence of a document to be scanned and the location of a leading edge of the document when positioned for subsequent movement along a document scan path;
   a document moving arrangement responsive to said sensor arrangement for moving said document along said document scan path across a document scanning area;
   said document scanning area being spaced apart from the location of the leading edge of the document by an unknown tolerance build up distance, said unknown tolerance build up distance being indicative of the distance between the starting location of the leading edge of the document when positioned for subsequent movement and the document scanning area;
   a calibration arrangement for determining said unknown tolerance build up distance;
   another sensor arrangement responsive to said calibration arrangement for causing the initiating of a document scanning operation when the leading edge of said document has travelled along said document scan path by a calibration distance; and
   wherein said calibration distance is substantially equal to the determined unknown tolerance build up distance.

16. A calibration system according to claim 15, wherein:
   said document is a calibration chart; and
   wherein said document moving arrangement advances said calibration chart a preset distance along said document scan path subsequent to the detection of the leading edge of said calibration chart.

17. A calibration system according to claim 16, further comprising:
   an associated facsimile machine having a scan mechanism for generating output data; and
   means responsive to the advancement of said calibration chart said preset distance for activation of said scan mechanism to cause said calibration chart to be scanned and to cause said scan mechanism to generate a stream of output data indicative of calibration information; and
   means responsive to said calibration information for determining where on said calibration chart relative to the leading edge said facsimile machine begain scanning by monitoring the stream of output data.

18. A calibration system according to claim 17 wherein said means responsive to said calibration information is for further determining an offset value to adjust the preset amount to compensate for tolerance stack-ups affecting the relative positions of the sensor arrangement and said scan mechanism.

19. A calibration system according to claim 18, wherein said calibration arrangement further includes means responsive to said offset value to adjust where on said document the facsimile machine begins scanning.

20. A calibration method, comprising:

determining the presence of a document to be scanned and the location of a leading edge of the document when positioned for subsequent movement along a document scan path;

moving said document along said document scan path across a document scanning area;

said document scanning area being spaced apart from the location of the leading edge of the document by an unknown tolerance build up distance;

determining said unknown tolerance build up distance, said unknown tolerance build up distance being indicative of the distance between the starting location of the leading edge of the document when positioned for subsequent movement and the document scanning area;

initiating a document scanning operation when the leading edge of said document has travelled along said document scan path by a calibration distance, said calibration distance being substantially equal to said build up tolerance distance.

* * * * *